United States Patent [19]

Hamman

[11] 4,209,723
[45] Jun. 24, 1980

[54] ELECTRIC MOTOR APPARATUS

[75] Inventor: Lyle J. Hamman, Eaton Rapids, Mich.

[73] Assignee: Eaton Stamping Company, Eaton Rapids, Mich.

[21] Appl. No.: 836,354

[22] Filed: Sep. 26, 1977

[51] Int. Cl.² ............................................. H02K 7/20
[52] U.S. Cl. ..................................... 310/112; 310/89; 310/239
[58] Field of Search ............... 310/112, 114, 126, 125, 310/89, 90, 239, 245, 246, 90, 242, 42, 43

[56] References Cited

U.S. PATENT DOCUMENTS

| | | | |
|---|---|---|---|
| 1,863,018 | 6/1932 | MacCutcheon | 310/246 |
| 2,532,827 | 12/1950 | Thomas | 310/246 |
| 3,584,248 | 6/1971 | Higashino et al. | 310/239 |
| 3,651,355 | 3/1972 | Mason | 310/112 |
| 4,056,749 | 11/1977 | Carlson et al. | 310/71 X |

Primary Examiner—Donovan F. Duggan
Attorney, Agent, or Firm—Beaman & Beaman

[57] ABSTRACT

The invention pertains to electric motor apparatus, including a method for forming an annular motor casing and the assembly of a plurality of electric motors with common casing end caps to produce a concise power unit capable of multiple functions, such as used with vehicle electric adjustable seats. The motor casing is mechanically assembled from formed flat sheet stock by defining interlocking projections and recesses in opposed stock blank ends wherein reception of the projections in the recesses deforms the projections and the recesses are obliquely related in pairs such that a mechanical interconnection results free of "spring back". Three identical motor casing and armature assemblies are maintained in side-by-side relationship by integral end caps, one of the caps including an armature brush card, and a feature of the invention is directed to a brush guide and spring assembly which permits spring biased brushes to be retained in a retracted position for assembly purposes and readily released to an operative condition.

3 Claims, 14 Drawing Figures

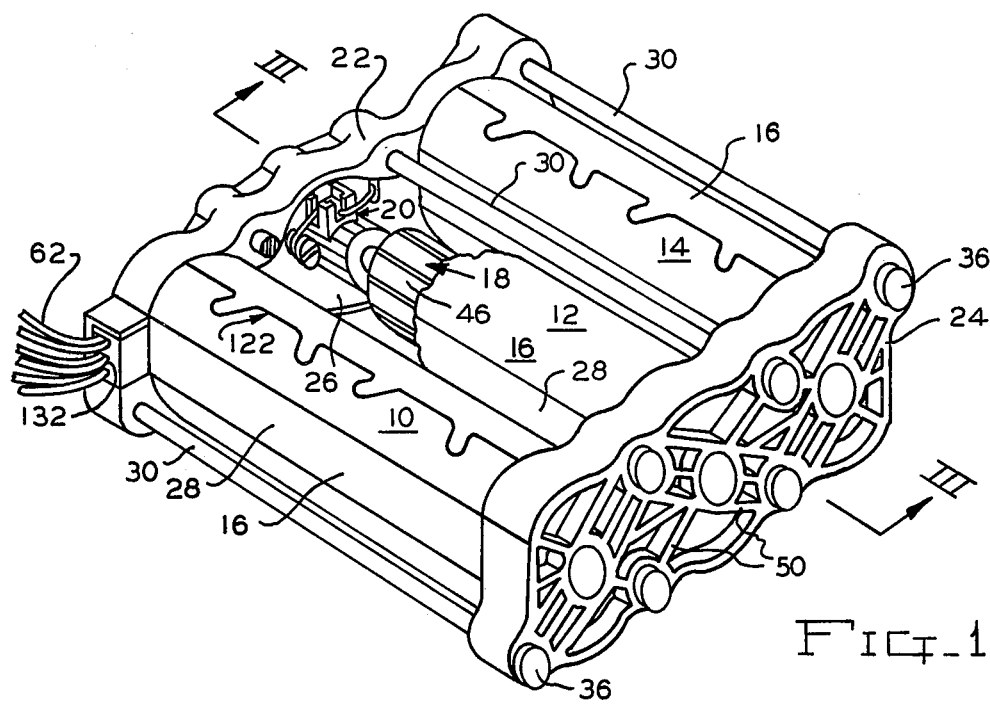
Fig_1_
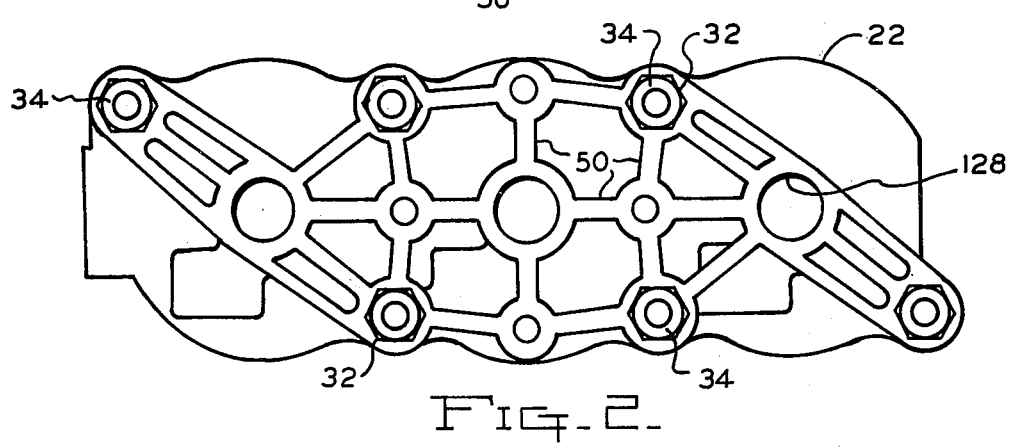
Fig_2_
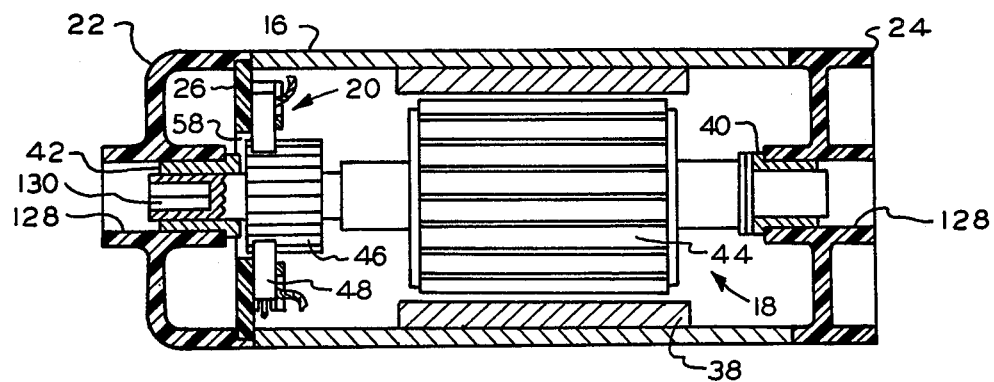
Fig_3_

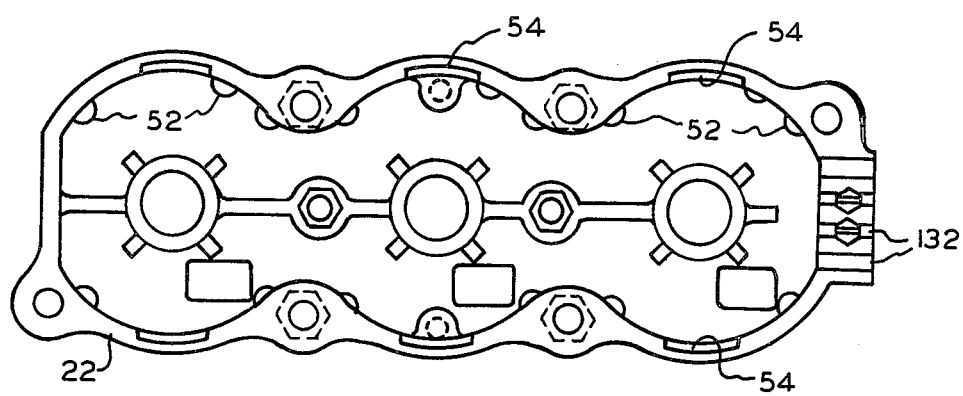
FIG_4
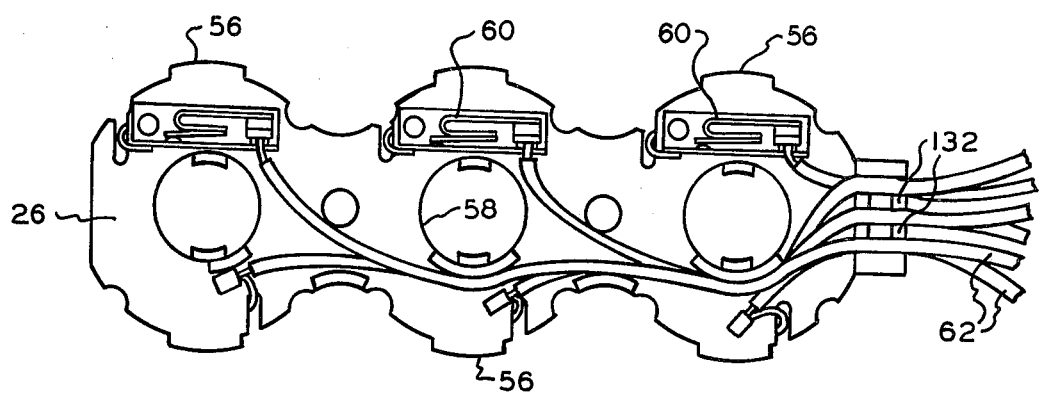
FIG_5
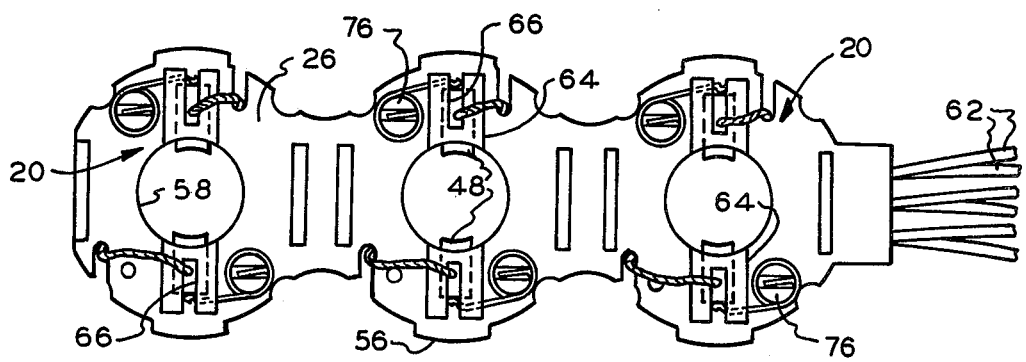
FIG_6
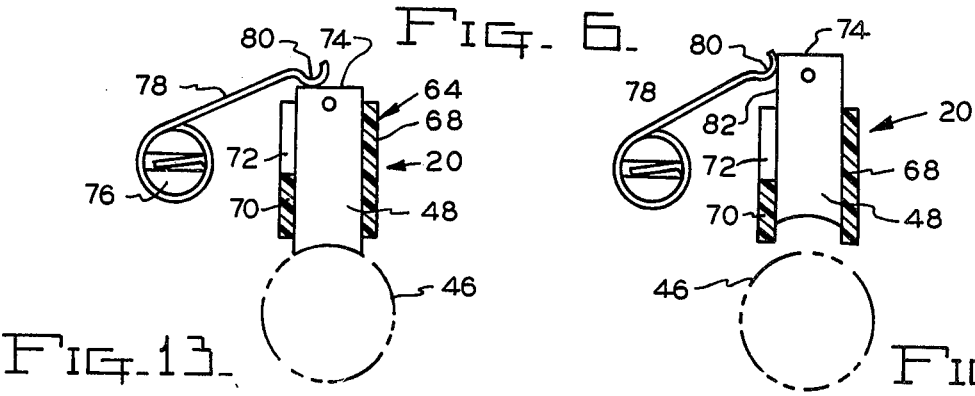
FIG_13
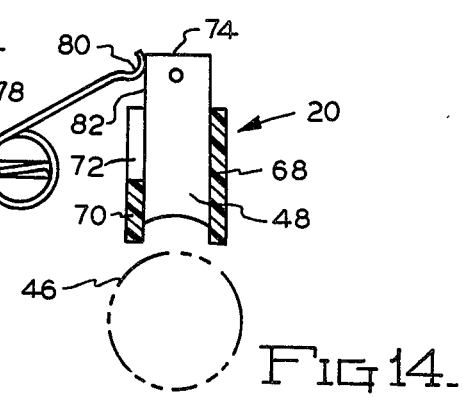
FIG_14

ELECTRIC MOTOR APPARATUS

BACKGROUND OF THE INVENTION

The invention pertains to electric motor apparatus, and particularly pertains to low cost low voltage motor units and multiple motor assemblies concisely interrelated.

12 volt electric motors of fractional horsepower are widely used in automotive applications for window regulation and seat adjustment purposes, and such motors must be capable of producing relatively high torque, reversible, dependable in operation, and concise in size and construction since such motors are mounted in door panels and under-seat installations. Vehicle electric seats permit reversible vertical adjustment of the front and rear seat portions as well as a traversing adjustment in the direction of the vehicle length, and such electric seat mechanisms, in the past, have been powered by a plurality of electric motors, usually three. Such plural seat adjustment motors have been incorporated into a concise multiple armature arrangement as shown in U.S. Pat. Nos. 3,365,163 and 3,437,303 wherein three armatures are located within a specially designed motor housing in parallel side-by-side relationship.

In the aforementioned patents the construction of such a multiple motor assembly is expensive as the motor casing and end caps are specially formed by metal castings for the particular application.

Electric motor constructions using sheet metal casings normally employ casings formed of special tubing or wherein the casing is formed of a formed sheet metal blank, second operations, such as welding, are required, to maintain the final casing configuration. Prior sheet metal formed motor casings are difficult to accurately form and require expensive assembly techniques.

SUMMARY OF THE INVENTION

It is an object of the invention to form an electric motor casing from flat sheet metal stock wherein a mechanical interconnection of opposite ends of the casing blank occurs which does not require welding or secondary operations and eliminates "spring back".

A further object of the invention is to provide a multiple electric motor assembly which is of a concise configuration utilizing a plurality of parallel casings and armatures in side-by-side relationship, the casings being closed at the ends by end cap members common to all the casings and armatures.

An additional object of the invention is to provide a multiple electric motor assembly utilizing separate casings and armatures and common end caps wherein the end caps are formed of a synthetic plastic dielectric material and contain the armature bearings, and an armature brush card is incorporated into one of the end caps wherein assembly of the multi-motor unit is simplified.

Yet a further object of the invention is to provide a commutator brush, brush guide and brush spring construction for electric motors wherein the brush spring maintains the brush in a retracted position for motor assembly purposes, yet functions to bias the brush into engagement with the armature commutator.

In the practice of the invention an annular electric motor casing is formed of flat sheet metal stock by stamping the casing blank from the stock wherein the blank includes a pair of ends. Projections are defined upon one of the ends extending in a direction substantially parallel to the length of the blank, while recesses are defined in the other blank end. The recesses are formed in pairs and are of a configuration substantially similar to the configuration of the projections, but the length of the recesses is obliquely related to the length of the blank. During assembly, the projections are forced, lengthwise, into the recesses and as the recesses are oblique to the configuration of the projections the projections are laterally displaced. The recesses of each pair are obliquely related in opposite directions with respect to the length of the blank wherein the deformation occuring in the projections prevents the projections from being withdrawn from the recesses once received and laterally deformed therein, and a strong mechanical interconnection results which eliminates "spring back" from the casing fully assembled condition.

The motor assembly end walls are formed of a synthetic plastic material and one end wall contains locating recesses and lugs for receiving a synthetic plastic dielectric brush card wherein assembly of the associated end cap will maintain the assembly of the brush card and end cap. Additionally, electric conductor receiving fingers are defined upon the associated end cap and brush card which intermesh to engage the electric conductors connected to components formed on the brush card wherein assembly of the brush card and associated end cap clamps the conductors relative to the motor unit.

The maintaining of the electric brushes in a retracted position is accomplished by utilizing a spring construction which engages the end of the brushes for radially biasing the same inwardly into engagement with the commutator. However, the spring construction engages a side of the brush when the brush is fully retracted from the commutator and this side engagement of the brush forces the brush against the brush guide sidewalls to frictionally hold the brush in the retracted position. The brushes may be readily restored to the operative condition by pushing the brushes inwardly until the spring again engages the outer end of the brushes for biasing the same inwardly.

DESCRIPTION OF THE DRAWINGS

The aforementioned objects and advantages of the invention will be appreciated from the following description and accompanying drawings wherein:

FIG. 1 is a perspective view of an electric motor assembly in accordance with the invention, a portion of the center motor casing being broken away to illustrate the armature and brush structure, FIG. 2 is an exterior elevational end view of the left end cap as viewed in FIG. 1, FIG. 3 is a diametrical sectional view as taken along section III—III of FIG. 1, FIG. 4 is an elevational view of the inside of the end cap illustrated in FIG. 2, FIG. 5 is an elevational view of one side of the brush card, FIG. 6 is an elevational view of the opposite side of the brush card shown in FIG. 5, FIG. 13 is a detail, enlarged sectional view of the brush, brush guide and brush spring assembly illustrating the brush in the operative position, and FIG. 14 is a view similar to FIG. 13 illustrating the brush being held in the retracted position by the brush spring.

DESCRIPTION OF THE PREFERRED EMBODIMENT

Figure 7:
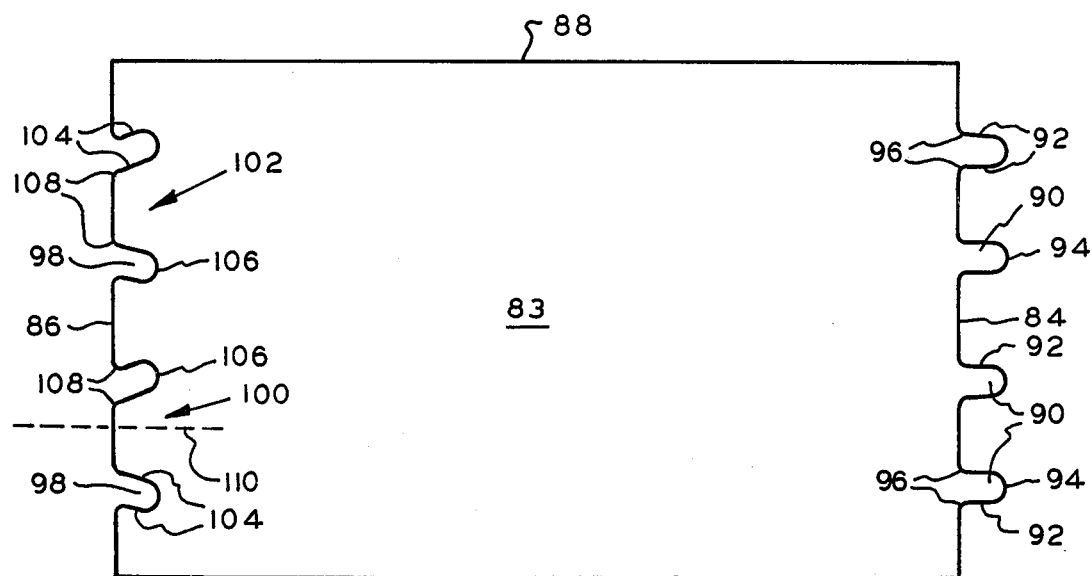
FIG. 7 is a plan view of the electric motor casing blank after being stamped from flat stock.

The general appearance of the multiple motor assembly constructed in accord with the invention will be appreciated from FIG. 1. Basically, the motor assembly consists of three motors of elongated configuration disposed in side-by-side relationship generally indicated by reference numerals 10, 12 and 14. The motors each include a tubular casing 16, armature 18, and commutator brush assembly 20, all of which are identical in construction and are represented by like reference numerals hereinafter. The ends of the casing are enclosed by synthetic plastic end caps 22 and 24, the end caps at each end of the casing being of a homogeneous construction, and a brush card 26 is mounted upon the end cap 22.

Figures 8, 9:
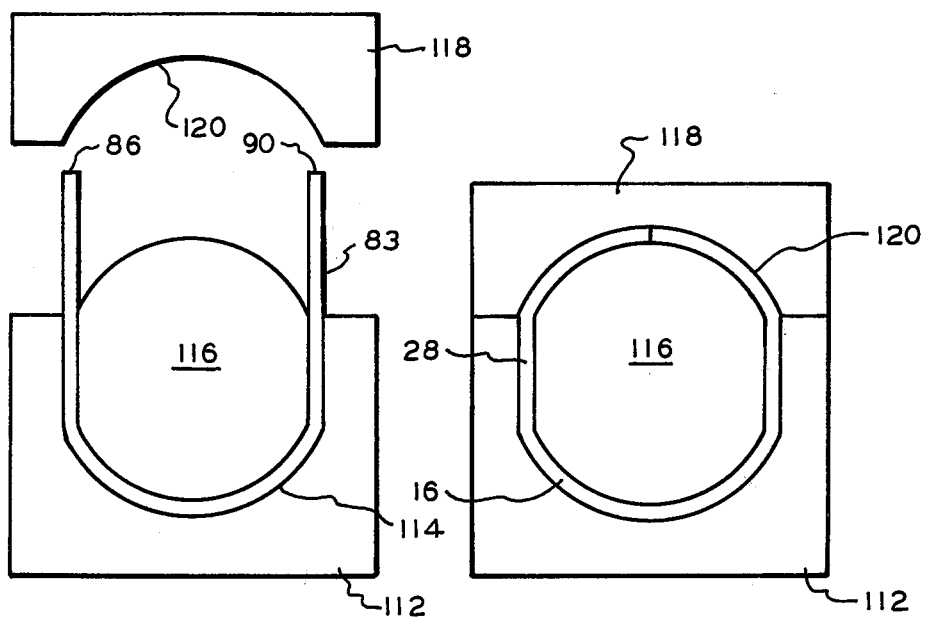
FIG. 8 is an end view illustrating the forming of the motor casing after the first bending of the casing blank has occurred, and prior to assembly of the projection and recesses.
FIG. 9 is a view similar to FIG. 8 illustrating the relationship of the blank ends and assembly die after assembly of the casing blank ends.

The motor casings 16 are of a general cylindrical configuration having lateral flats 28 defined thereon, FIGS. 1 and 9, which permits the casings to be located in close proximity to each other. Tie rods 30 extend between the end caps 22 and 24 to maintain the end caps upon the casings, and the end caps are provided with holes for receiving the tie rods. End cap 22 includes hexagonal nut receiving recesses 32 formed thereon receiving the nuts 34 into which the threaded end of the tie rods are received. Thus, it is not necessary to apply a wrench to the tie rod nuts during assembly as rotation of the tie rod heads 36, FIG. 1, will tighten the tie rods and complete the assembly.

The casings 16 are formed of sheet metal, as will be later described, and the motor field coil 38 is mounted within the casing, FIG. 3. The end cap 24 is provided with three sleeve bearings 40, while the end cap 22 supports three sleeve bearings 42, the sleeve bearings being in alignment with the axis of a motor to respectively receive the cylindrical ends of an armature 18. Each armature includes a coil 44 and a commutator 46 engaged by a pair of brushes 48 mounted upon the brush card 26.

The end caps 22 and 24 are preferably formed of a dielectric injection moldable synthetic plastic, and the inside surface of the end caps is flat so as to tightly engage the flat, planar ends of the motor casings 16. The outer portions of the end caps are provided with a plurality of raised ribs 50 which strengthen the end caps, yet permit a minimum mass of material to be required.

The inner surfaces of the end caps are provided with casing locating projections 52, FIG. 4, and the end cap 22 also includes a plurality of brush card locating recesses 54 which receive the projections 56 defined upon the brush card 26, FIG. 5.

The brush card 26 is of synthetic, dielectric plastic material and includes three identical sections each having a central opening 58 through which the armature commutator 46 of the associated armature is received. Upon its "outer" surface, a bimetal circuit breaker 60 is mounted and electric wire conductors 62 are disposed along the outer surface in connection with the electric brushes located upon the opposite side of the card blank.

On the "inner" side of the brush card a plurality of brush guides 64 are homogeneously molded thereon, each guide 64 being of a generally rectangular cross-sectional configuration and a pair of guides being associated with each commutator and opening 58. Each guide is provided with a brush conductor-receiving slot 66, and the guides include a lateral sidewall 68, and a lateral sidewall 70 in which a spring-receiving slot 72 is formed.

A carbon brush 48 is slidably mounted within each guide 64, and includes an outer end 74. A spring anchor 76 is homogeneously molded upon the brush card adjacent the guide sidewall 70 and includes a diametrical slot for receiving an end of the brush spring 78, which is of the torsion type and includes a free cantilevered end 80 having a convex portion defined thereon.

The length of the spring is such that the end 80 engages the brush outer end 74 when the brush is in the operative position as shown in FIGS. 6 and 13. Thus, the spring will bias the associated brush 48 into engagement with the armature commutator, represented by circle 46 in FIGS. 13 and 14, and maintain an electrical conducting relationship with the commutator.

For assembly purposes, the brushes 48 may be retracted from adjacent the brush card opening 58 to the position shown in FIG. 14 wherein the outer end portion 80 of the spring engages the brush sidewall 82. This engagement of the spring end with the brush forces the outer end of the brush against the sidewall 68 and the lower end of the brush against the lower portion of sidewall 70 producing a frictional resistance to sliding of the brush within the guide and maintaining the brush in the retracted position shown in FIG. 14. With all of the brushes on the brush card being held in the retracted position, as shown in FIG. 14, assembly of the brush card, end cap and armatures is simplified, and once the commutators have been aligned "under" the brushes the brushes may be pushed inwardly until the spring end portion 80 engages the brush end 74, FIG. 13, which permits the spring 78 to bias the brush inwardly into its operative position with the commutator.

The casings 16 are identical in configuration and are fabricated identically from flat sheet metal stock, such as cold rolled steel of approximately 0.075" thickness. As will be appreciated from FIG. 7, the flat blank 83, as stamped, consists of a generally rectangular blank having end edges 84 and 86, and linear lateral side edges 88. The end edge 84 is provided with four elongated projections 90 each defined by sidewalls 92 terminating in a rounded free edge 94, and the sidewalls are radiused at 96 at the intersection with the end edge 84. The length of the projections 90 is parallel to the "length" of the blank 83 as defined by the end edges 84 and 86.

A plurality of recesses 98 are defined in the blank 83 intersecting the end edge 86, and in the embodiment of FIG. 7 the recesses constitute sets of pairs 100 and 102. The recesses are defined by parallel sidewalls 104, a radiused end surface 106, and radii 108 where the sidewalls intersect the end edge 86. The "depth" of the recesses 98 corresponds to the "length" of the projections 90, and the distance between the projections sidewalls 92 is identical to the distance between the recess sidewalls 104. Likewise, the radius of the projection end 94 is identical to the radius of the recess end surface 106, and the projection radii 96 correspond in dimension to the recess radii 108.

It will be appreciated from FIG. 7 that the "length" of the two recesses constituting a set, are obliquely related to the associated end edge 86, and are angularly related in opposite directions with respect to a line parallel to the length of the blank located intermediate the recesses such as at 110, FIG. 7. The purpose of this oblique recess orientation will be described below.

To form the flat blank 83, of FIG. 7 to the desired annular casing configuration, the blank is located within a bending die and formed in a U-shaped configuration, as represented in FIG. 8. The die for so forming the blank is of conventional nature.

After preliminarily forming the blank 83 into the U-configuration of FIG. 8, the blank is placed within a die 112 such as shown in FIG. 8 wherein the lower half of the blank rests within a complementarily shaped recess 114 formed in the die. A mandrel 116 is inserted into the blank having an exterior configuration corresponding to the desired final interior casing configuration, and the upper die portion 118 is of a cylindrical segment configuration 120.

Figure 10:
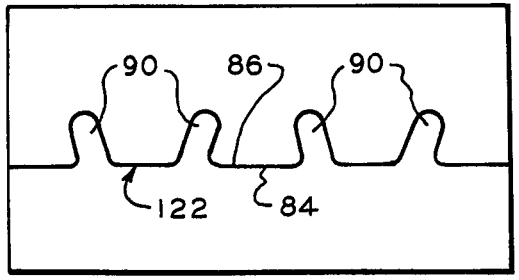
FIG. 10 is a plan view of the assembled motor casing joint.

The upper die 118 is now lowered into engagement with the end edge projections 90 and edge 86 bending the end edge portions of the casing toward each other as they follow the contour of the die cavity 120. As the casing blank end edges approach each other each projection 90 will enter the "throat" of a recess 98 as defined intermediate the recess radiuses 108 of a common recess, and as the die 118 continues to be lowered the projections increasingly penetrate the recesses and the forward rounded ends 94 thereof will engage the recess sidewalls 104 obliquely disposed to the projection sidewalls. Thus, the oblique orientation of the recesses 98 will laterally deflect the projections 90 within their associated recess to conform to the recess configuration and angular orientation and this lateral deflection permanently deforms the projections. The die 118 continues to be lowered to the position of FIG. 9 whereby the recesses 98 will be completely filled with an associated projection 90 wherein the "seam" 122 of the casing will appear as shown in FIG. 10.

The deflection of the projections 90 within the recesses 98 produces a high strength mechanical innerconnection of the casing end edges 84 and 86. The die 118 and mandrel 116 assure that the projections and recesses are in the same circular "plane" during assembly and, as the recesses are obliquely disposed in dissimilar directions with respect to the circumference of the casing there is no "spring back" of the casing end edges after assembly. Thus, a tight, positive, interlocking between the projections and recesses is produced which does not require welding or other secondary operations, and no overlapping occurs at the casing end edge region.

In the embodiment described with respect to FIGS. 7-9, two sets of recesses 100 and 102 are shown and it will be appreciated that a single set, or more than two sets of recesses could be used wherein the recesses are obliquely disposed with respect to each other. In the practice of the invention, the use of a pair of projections or recesses is desirable to prevent a lateral shifting of the end edges which may permit partial disassembly of a projection and recess. However, it is possible to produce a mechanical innerconnection of this type using only a single projection and recess, although a pair of recesses obliquely disposed in relatively opposite directions is preferred.

Figure 11:
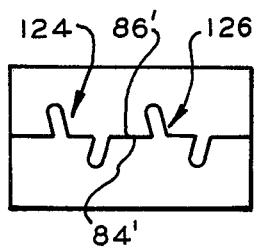
FIG. 11 is a plan view of another arrangement of the casing joint projections and recesses.

FIG. 11 illustrates a modification of an arrangement of projections and recesses wherein the casing end edges 84' and 86' each include projections and recesses and the projections and recesses of a common set, as represented by sets 124 and 126, are obliquely disposed relative to each other.

Figure 12:
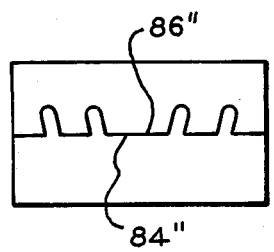
FIG. 12 is a plan view of an additional arrangement of casing joint projections and recesses.

Also, other arrangements of the projections and recesses are within the scope of the invention as represented in FIG. 12. wherein while the projections and recesses are each located upon a common blank end edge 84" or 86", respectively, adjacent projections and recesses are disposed in like directions, but two projections extend in one oblique direction while the other two projections extend in the opposite oblique direction with respect to the circumferential casing dimension.

The three-motor assembly permits a plurality of small electric motors to be concisely arranged for mounting under a vehicle seat, for instance, and the rotative movement of the armatures can be transmitted to drive shafts extending from holes 128 defined in the end caps 22 and 24. Such drive shafts may be received within noncircular holes 130, FIG. 3, formed in the ends of the armature. The flats 28 defined upon the casings 16 permit the armatures to be located relatively close to each other and the forming of the casings of stamped sheet metal, and the end caps 22 and 24 of molded dielectric synthetic plastic material permits construction costs to be minimized.

Assembly of the described components is readily achieved by assemblying the casings, end caps, armature and brush card by tightening the tie rods 30 in association with nuts 34, and as the brush card 26 fits closely within the locating recesses defined in end cap 22 the tightening of the tie rods maintains the brush card in its desired location as well as maintaining the assembly between the end caps and the casings and armatures.

Conductors 62 are clamped with respect to the end cap 22 and brush card 26 by a plurality of fingers 132 defined upon the brush card and the end cap, and these fingers intermesh but are of reduced length wherein the conductors may be tightly received between the recesses defined by the fingers and the end of the intermeshing finger. Thus, assembly of the end cap 22 and brush card 26 also simultaneously permanently supports the conductors 62 relative to the motor assembly.

It will be appreciated that various modifications to the disclosed embodiments may be apparent to those skilled in the art without departing from the spirit and scope thereof.

I claim:

1. A multiple electric motor assembly comprising, in combination, a plurality of separate, metallic, annular motor casings in parallel, side-by-side relationship each having an axis, a first end and a second end, a single piece first synthetic plastic cap mounted upon said casings' first ends, a plurality of first armature bearings mounted in said cap whereby a bearing is located coaxial with each casing axis, a second single piece synthetic plastic cap mounted upon said casings' second ends, a plurality of second armature bearings mounted in said second cap whereby a second bearing is located coaxial with each casing axis, an armature rotatably mounted within each casing upon said first and second bearings, said casings being of sufficient length to substantially enclose the associated armature, tie rods interposed between said end caps maintaining assembly thereof upon said casings, a brush card mounted upon said second end cap having a plurality of openings therein each receiving an armature, a plurality of electric brushes mounted upon said card adjacent each opening engaging the adjacent armature, and a plurality of interengaging lugs and recesses defined on said second end cap and said brush card to assure predetermined alignment of said brush card on said second end cap during assembly.

2. A brush holder for electric motors comprising, in combination, a support, an elongated guide mounted on said support having open inner and outer ends and side walls, a brush slidably received within said guide having an outer end and a side wall and movable between an operative position and a retracted position, a torsion spring mounted upon said support adjacent one of said guide side walls intermediate said inner and outer ends, a slot defined in said one guide side wall, said spring having a free end extension receivable within said slot directly terminating in an arcuate convex brush-engaging portion selectively engaging said brush outer end when said brush is in said operative position biasing said brush toward said guide inner end and engaging said brush side wall when said brush is in said retracted position biasing said brush against said guide side walls to retain said brush in said retracted position.

3. A multiple electric motor assembly comprising, in combination, a plurality of separate, metallic, annular motor casings in parallel, side-by-side relationship each having an axis, a first end and a second end, a single piece first synthetic plastic cap mounted upon said casings' first ends, a plurality of first armature bearings mounted in said cap whereby a bearing is located coaxial with each casing axis, a second single piece synthetic plastic cap mounted upon said casings' second ends, a plurality of second armature bearings mounted in said second cap whereby a second bearing is located coaxial with each casing axis, an armature rotatably mounted within each casing upon said first and second bearings, said casings being of sufficient length to substantially enclose the associated armature, tie rods interposed between said end caps maintaining assembly thereof upon said casings, a brush card mounted upon said second end cap having a plurality of openings therein each receiving an armature, a plurality of electric brushes mounted upon said card adjacent each opening engaging the adjacent armature, a plurality of electric conductors connected to said brush card and brushes, and intermeshing conductor holding fingers defined on said second end cap and brush card engaging and holding said conductors upon assembly of said second end cap upon said casings.

* * * * *